(12) United States Patent
Brogardh

(10) Patent No.: US 10,737,379 B2
(45) Date of Patent: Aug. 11, 2020

(54) COMPACT PARALLEL KINEMATICS ROBOT

(71) Applicant: ABB Schweiz AG, Baden (CH)

(72) Inventor: Torgny Brogardh, Vasteras (SE)

(73) Assignee: ABB Schweiz AG, Baden (CH)

( * ) Notice: Subject to any disclaimer, the term of this patent is extended or adjusted under 35 U.S.C. 154(b) by 570 days.

(21) Appl. No.: 14/890,814

(22) PCT Filed: May 23, 2013

(86) PCT No.: PCT/EP2013/060561
§ 371 (c)(1),
(2) Date: Nov. 12, 2015

(87) PCT Pub. No.: WO2014/187486
PCT Pub. Date: Nov. 27, 2014

(65) Prior Publication Data
US 2016/0089776 A1 Mar. 31, 2016

(51) Int. Cl.
*B25J 9/00* (2006.01)
*B25J 17/02* (2006.01)
*B25J 11/00* (2006.01)

(52) U.S. Cl.
CPC ............. *B25J 9/009* (2013.01); *B25J 9/0072* (2013.01); *B25J 11/005* (2013.01); *B25J 17/0266* (2013.01); *Y10S 901/14* (2013.01)

(58) Field of Classification Search
CPC . B25J 9/0048; B25J 9/0051; B25J 9/02; B25J 9/048; B25J 9/06; B25J 9/10;
(Continued)

(56) References Cited

U.S. PATENT DOCUMENTS

| | | | |
|---|---|---|---|
| 6,412,363 B1 * | 7/2002 | Brogårdh | B25J 17/0266 74/490.05 |
| 7,011,489 B2 * | 3/2006 | Brogardh | B23Q 1/5462 414/735 |

(Continued)

FOREIGN PATENT DOCUMENTS

| | | |
|---|---|---|
| WO | 03066289 A1 | 8/2003 |
| WO | 03078111 A1 | 9/2003 |

(Continued)

OTHER PUBLICATIONS

International Preliminary Report on Patentability Application No. PCT/EP2013/060561 Completed: Apr. 29, 2015;dated Apr. 29, 2015 7 pages.

(Continued)

*Primary Examiner* — Saul Rodriguez
*Assistant Examiner* — Brendan P Tighe
(74) *Attorney, Agent, or Firm* — Whitmyer IP Group LLC

(57) ABSTRACT

An industrial robot includes first and second kinematic chains configured to transmit the movements of corresponding first and second actuators to respective movements of an end effector. The first kinematic chain includes a first rod which is stiff. The second kinematic chain includes elements between the second actuator and the first rod such that the actuation of the second actuator causes bending forces on the first rod. The first and second kinematic chains thereby have the first rod as a common element, which improves compactness and accessibility of the robot. This improvement assumes that the robot is provided with one or more stiff rods that can bear the bending forces resulting from the actuation of the corresponding actuators.

19 Claims, 4 Drawing Sheets

(58) Field of Classification Search
CPC . B25J 11/00; B25J 11/005; B25J 17/02; B25J 17/0266; B25J 17/0283; B25J 18/00; B25J 18/04; Y10S 901/24; Y10T 74/20317; Y10T 74/20329; Y10T 74/20335
USPC .......... 74/490.05, 490.06; 414/589; 901/29
See application file for complete search history.

(56) References Cited

U.S. PATENT DOCUMENTS

| | | | |
|---|---|---|---|
| 7,188,544 B2 | 3/2007 | Persson et al. | |
| 7,331,750 B2* | 2/2008 | Merz | B25J 9/104 414/735 |
| 7,685,902 B2* | 3/2010 | Kock | B25J 9/107 414/735 |
| 2004/0103739 A1 | 6/2004 | Brogardh et al. | |
| 2006/0245894 A1 | 11/2006 | Merz et al. | |
| 2013/0189063 A1* | 7/2013 | Brogardh | B25J 17/02 414/589 |

FOREIGN PATENT DOCUMENTS

| | | |
|---|---|---|
| WO | 2006101893 A2 | 9/2006 |
| WO | 2006106165 A1 | 10/2006 |
| WO | 2012031635 A1 | 3/2012 |
| WO | 2012031954 A1 | 3/2012 |

OTHER PUBLICATIONS

International Search Report and Written Opinion of the International Searching Authority Application No. PCT/EP2013/060561 Completed: Feb. 13, 2014;dated Feb. 24, 2014 9 pages.
Chinese Office Action Application No. 201380075558X dated May 23, 2016 2 pages.

* cited by examiner

COMPACT PARALLEL KINEMATICS ROBOT

FIELD OF THE INVENTION

The present invention relates to an industrial robot comprising a plurality of actuators working in parallel to manipulate an end effector.

BACKGROUND OF THE INVENTION

Conventional parallel kinematics robots comprise a plurality of drive arms each connected, directly or via a gearbox, to a respective shaft of a servo motor at one end. At the opposite end the drive arms are attached to a proximate end of rods via ball joints having three degrees of freedom (DOF). The rods transmit the rotating movement of the drive arms to a respective movement of an end effector that is attached to a distal end of the rods via ball joints. The servo motors and the respective drive arms are thereby working in parallel in the sense that manipulation of one drive arm does not affect the position of the remaining drive arms.

A delta robot is one well known type of parallel kinematics robot that can comprise three drive arms. Each drive arm is connected to an end effector with two rods having a ball joint at each end. The drive arms rotate about respective servo motor axes, the servo motors being arranged symmetrically such that their axes intersect at 60 degrees angles. Because the drive arms of a delta robot are relatively long and point in different directions the robot construction needs a lot of space. U.S. Pat. No. 7,188,544 discloses one type of a delta robot comprising three drive arms. Delta robots can also comprise four or more drive arms.

WO200366289 discloses other and less well known types of parallel kinematics robots comprising three or more drive arms. The robots according to WO200366289 differ from delta robots in that the rotational axes of the drive arms are parallel, and in many embodiments the drive arms even have one common rotational axis. The number of rods between the drive arms and the end effector vary from one to three depending on a drive arm and a robot embodiment. Also the drive arms of the robots according to WO200366289 need to be relatively long and well spread, and consequently need a lot of space.

Common for the both aforementioned parallel kinematics robot types is that the rods between the drive arms and the end effector are designed to be exposed to axial forces only. The necessary stiffness of the robots is obtained by spreading out the rods. As a consequence the conventional parallel kinematics robots cannot compete with SCARA robots in many applications because of their relatively poor accessibility and large space requirement.

SUMMARY OF THE INVENTION

One object of the invention is to provide an improved parallel kinematics robot which is compact and has a high accessibility.

This object is achieved by the device according to the claimed invention.

The invention is based on the realization that by providing a parallel kinematics robot with one or more stiff rods all the remaining rods do not need to be connected directly to an end effector. Instead, some rods can be connected to the end effector via the stiff rod or rods that are able to bear the resulting bending forces and transmit the corresponding movements to the end effector.

According to a first aspect of the invention, there is provided an industrial robot comprising: a first actuator configured to rotate a first drive arm about a first axis, a second actuator, and a first kinematic chain configured to transmit the rotation of the first drive arm to a respective movement of an end effector. The first kinematic chain comprises a first rod, a first joint between the first drive arm and the first rod, the first joint having at least two degrees of freedom, and a second joint between the first rod and the end effector. The industrial robot comprises a second kinematic chain configured to transmit a movement of the second actuator to a respective movement of the end effector. The second kinematic chain comprises a fourth joint between the second actuator and the first rod, the first rod, and the second joint. By arranging the first and the second kinematic chains to share a rod and a joint, the number of rods and joints directly connected to the end effector can be correspondingly decreased. As a result, the accessibility of the robot is improved.

According to one embodiment of the invention the second kinematic chain is configured to expose the first rod to a bending force. A bending force implicitly implies that the first and the second kinematic chains are designed to cause movements in different directions.

According to one embodiment of the invention the second kinematic chain is configured to cause a rotation of the first rod about the first joint.

According to one embodiment of the invention the second kinematic chain further comprises a second rod, and a third joint between the second actuator and the second rod. A rod is a simple means for transmitting the movement of the second actuator to a respective movement of the end effector.

According to one embodiment of the invention the second actuator is configured to rotate a second drive arm about a second axis, the first drive arm and the second drive arm working in parallel. The present invention is particularly well adapted to be applied on parallel kinematics robot.

According to one embodiment of the invention the first kinematic chain further comprises a third rod, a fifth joint between the first drive arm and the third rod, and a sixth joint between the third rod and the end effector. By providing the first kinematic chain with two rods working in parallel the movements of the end effector are further constrained.

According to one embodiment of the invention the first rod and the third rod are geometrically parallel. By providing the first kinematic chain with two rods being geometrically parallel the movements of the end effector are further constrained.

According to one embodiment of the invention the first rod is stiffer than the third rod. The first rod needs to be relatively stiff in order to be able to bear the bending force it is exposed to. The remaining rods do not have the same requirement and consequently the remaining rods can be made less stiff to keep the weight of the moving parts as low as possible.

According to one embodiment of the invention the first kinematic chain further comprises a fourth rod, a seventh joint between the first drive arm and the fourth rod, and an eighth joint between the fourth rod and the end effector. By providing the first kinematic chain with three rods working in parallel the movements of the end effector are further constrained.

According to one embodiment of the invention the first rod, the third rod and the fourth rod are geometrically parallel. By providing the first kinematic chain with three rods being geometrically parallel the movements of the end effector are further constrained.

According to one embodiment of the invention the first joint, the fifth joint and the seventh joint have a rotational degree of freedom about a common axis. By arranging the first joint, the fifth joint and the seventh joint on a common axis, the movements of the end effector are further constrained even when all the three joints have three DOF.

According to one embodiment of the invention the industrial robot further comprises: a third kinematic chain configured to transmit a movement of a third actuator to a respective movement of the end effector, the third kinematic chain comprising a fifth rod, a ninth joint between the third drive arm and the fifth rod, a tenth joint between the fifth rod and the first rod, the first rod, and the second joint. By arranging the first, the second and the third kinematic chains to share a rod and a joint, the number of rods and joints directly connected to the end effector can be correspondingly decreased. As a result, the accessibility of the robot is further improved.

According to one embodiment of the invention the third actuator is configured to rotate a third drive arm about a third axis, the first drive arm, the second drive arm and the third drive arm working in parallel. The present invention is particularly well adapted to be applied in parallel kinematics robot.

According to one embodiment of the invention the first axis, the second axis and the third axis are geometrically parallel.

According to one embodiment of the invention the first axis, the second axis and the third axis coincide. By this measure the robot can be arranged to be able to rotate a full circle.

According to one embodiment of the invention the first axis can rotate a full circle. By this measure the work area of the robot is improved.

According to one embodiment of the invention all the rods directly connected to the end effector are geometrically parallel. By this measure the accessibility of the robot is further improved.

According to one embodiment of the invention the fourth and the second joints are located on opposite sides of the first joint when considering the direction of the longitudinal axis of the first rod. By this measure the accessibility of the robot is further improved.

BRIEF DESCRIPTION OF THE DRAWINGS

The invention will be explained in greater detail with reference to the accompanying drawings, wherein.

DETAILED DESCRIPTION OF THE INVENTION

Figure 1:
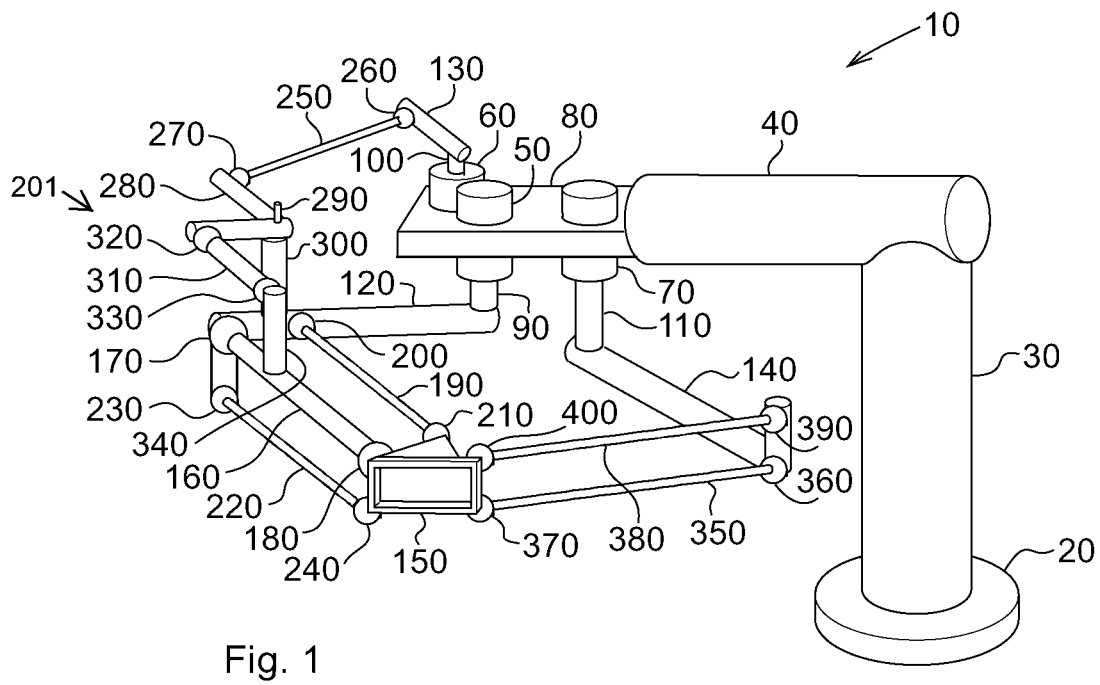
FIG. 1 shows an embodiment of the invention with one stiff rod being part of two separate kinematic chains.

Referring to FIG. 1, an industrial robot 10 according to one embodiment of the invention comprises a robot frame having a foot 20 via which the robot 10 can be attached to a floor, a fundament, a wall, a ceiling or another steady structure. The robot frame further comprises a pillar 30 fixedly attached to the foot 20, and a beam 40 fixedly attached to the pillar 30. Three servo motors 50, 60, 70 are attached to a base 80 which can be fixedly or movably attached in relation to the beam 40. Each servo motor 50, 60, 70 has a shaft 90, 100, 110 to which a drive arm 120, 130, 140 is fixedly attached. The first, second and third servo motors 50, 60, 70 thereby function as actuators for the respective drive arms 120, 130, 140 that are rotatable about the respective servo motor axes. Each drive arm 120, 130, 140 is connected to an end effector 150 by means of a respective kinematic chain that is configured to transmit the rotation of the drive arm 120, 130, 140 to a respective movement of the end effector 150.

A first drive arm 120 is fixedly attached to the first servo motor shaft 90, and is thereby rotatable about a first axis. The first drive arm 120 is connected to the end effector 150 by means of a first kinematic chain consisting of a first rod 160, a first joint 170 between the first drive arm 120 and the first rod 160, a second joint 180 between the first rod 160 and the end effector 150, a third rod 190, a fifth joint 200 between the first drive arm 120 and the third rod 190, a sixth joint 210 between the third rod 190 and the end effector 150, a fourth rod 220, a seventh joint 230 between the first drive arm 120 and the fourth rod 220, and an eighth joint 240 between the fourth rod 220 and the end effector 150. The first kinematic chain thereby comprises three rods and six joints. The three rods are geometrically parallel i.e. the longitudinal axes of the rods are and remain parallel in direction. Consequently, the orientation of the end effector 150 in relation to the first drive arm 120 remains constant. The three rods also work in parallel in the meaning that each of them affects the position of the end effector 150 directly and not via another of the three rods. The six joints can comprise joints with two or three DOF.

A second drive arm 130 is fixedly attached to the second servo motor shaft 100, and is thereby rotatable about a second axis. The second drive arm 130 is connected to the end effector 150 by means of a second kinematic chain comprising: a second rod 250, a third joint 260 between the second drive arm 130 and the second rod 250, a sub-chain portion including a fourth joint 270 between the second rod 250 and the first rod 160, the first rod 160, and the second joint 180 between the first rod 160 and the end effector 150. The second kinematic chain, in particular the sub-chain portion 201 of the second kinematic chain, further comprises an elbow 280, a first hinge 290 between the elbow 280 and a first drive arm offset beam 300, a first serial rod 310, an thirteenth joint 320 between the elbow 280 and the first serial rod 310, and a fourteenth joint 330 between the first serial rod 310 and a first rod offset beam 340.

It is to be understood that the elbow 280, the first hinge 290, the first serial rod 310, the thirteenth joint 320 and the fourteenth joint 330 are not essential elements for the invention. The main principle of the invention, i.e. letting a rod be part of at least two separate kinematic chains, would be achieved even if the fourth joint 270 was connected to the first rod offset beam 340 directly i.e. without the aforementioned elements in between. However, these elements and other corresponding elements in the remaining robot embodiments of this disclosure are optional elements the purposes of which include among other things: decreasing the transmission forces, improving the accessibility of the robot 10, and optimizing the dynamics of the kinematic chains. It is also to be understood that, in the context of the present disclosure, when it is stated that element A is connected to element B, it does not necessarily mean that elements A and B have a direct connection between them. In other words, it is not excluded that there are additional elements between elements A and B via which the element A is connected to the element B. It is furthermore to be understood that rigid extensions of an element are considered to be part of that element. For example, the first drive arm offset beam 300 is part of the first drive arm 120, and the first rod offset beam 340 is part of the first rod 160. It is furthermore to be understood that, in the context of the present disclosure, when at least one rigid part of an element is necessary for completing a kinematic chain, the whole elements shall be considered to be comprised in that kinematic chain.

Further referring to FIG. 1, a third drive arm 140 is fixedly attached to the third servo motor shaft 110, and is thereby rotatable about a third axis. The third drive arm 140 is connected to the end effector 150 by means of a third kinematic chain consisting of a fifth rod 350, a ninth joint 360 between the third drive arm 140 and the fifth rod 350, a tenth joint 370 between the fifth rod 350 and the end effector 150, a sixth rod 380, an eleventh joint 390 between the third drive arm 140 and the sixth rod 380, and a twelfth joint 400 between the sixth rod 380 and the end effector 150. The third kinematic chain thereby comprises two rods and four joints. The two rods are geometrically parallel and they also work in parallel. The four joints can comprise joints with two or three DOF.

The first rod 160 is stiff such that it can bear the bending force resulting from the actuation of the servo motors 50, 60, 70, especially of the second servo motor 60. In particular, the first rod 160 is stiffer than the second, third, fourth, fifth and sixth rods 250, 190, 220, 350, 380 that are designed to be exposed to axial forces only.

Figure 2:
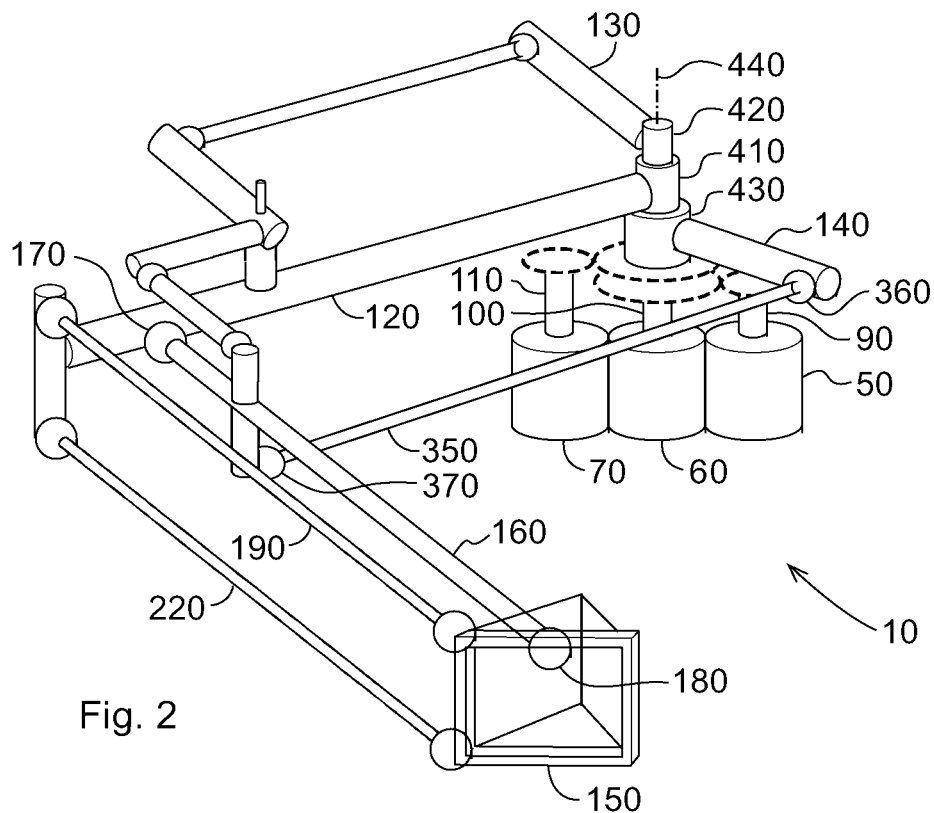
FIG. 2 shows an embodiment of the invention with one stiff rod being part of three separate kinematic chains.

Referring to FIG. 2, in contrast to the robot 10 of FIG. 1 the drive arms 120, 130, 140 are no longer fixedly attached to the servo motor shafts 90, 100, 110. Instead, the servo motors 50, 60, 70 are arranged to actuate the drive arms 120, 130, 140 via gear boxes, and the drive arms 120, 130, 140 are fixedly attached to respective first, second and third output shafts 410, 420, 430 which are arranged to be coaxial about a fourth axis 440. The drive arms 120, 130, 140 thereby have a common rotational axis, which enables the rotation of the drive arms 120, 130, 140 over a full circle.

The first and second kinematic chains of FIG. 2 are similar to those of FIG. 1, but the third kinematic chain is very different. Instead of being connected directly (by the tenth joint 370) to the end effector 150, the fifth rod 350 is connected to the end effector 150 via the first rod 160. Furthermore, in contrast to the robot 10 of FIG. 1 the sixth rod 380 is omitted. In order to compensate for the missing sixth rod 380 and to constrain all the six DOF of the end effector 150, the first and second joints 170, 180 can be chosen to be cardan joints with two DOF. When comparing the embodiments of FIGS. 1 and 2, it can be established that the accessibility of the robot 10 of FIG. 2 is greatly improved as all the rods 160, 190, 220 directly connected to the end effector 150 are geometrically parallel i.e. extend in a single direction.

Figure 3:
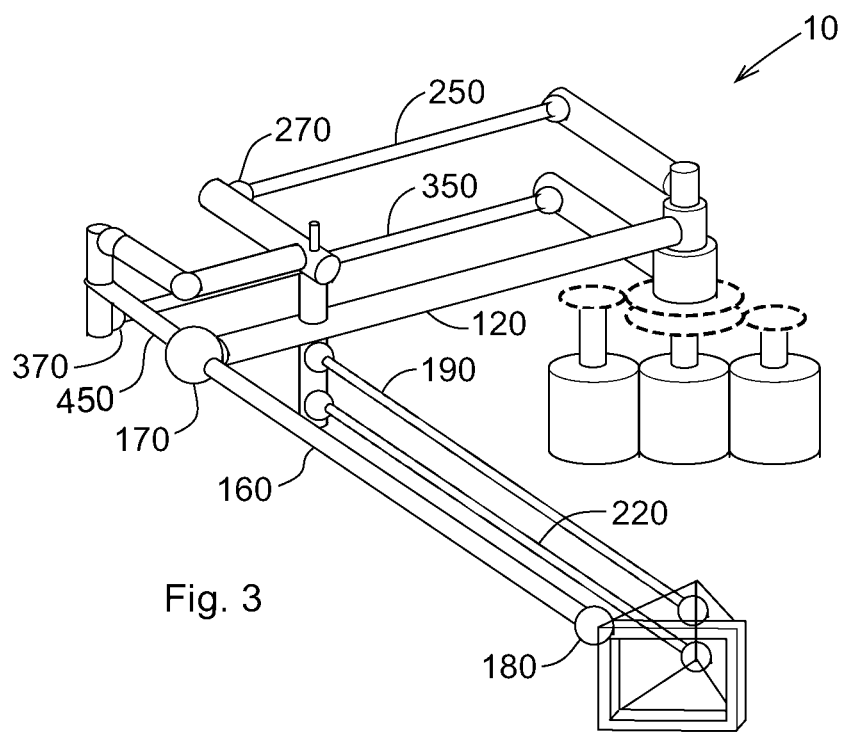
FIG. 3 shows an embodiment of the invention with two rods connected to an extension of a stiff rod.

Referring to FIG. 3, all the three kinematic chains are similar to those of FIG. 2, the most important difference being that the first rod 160 comprises an extension 450 to which the second and fifth rods 250, 350 are connected. As a consequence, the fourth and the tenth joints 270, 370, and the second joint 180, respectively, are located on opposite sides of the first joint 170 when considering the direction of the longitudinal axis of the first rod 160. When comparing the embodiments of FIGS. 2 and 3, it can be established that the accessibility of the robot 10 of FIG. 3 is further improved as all the rods 160, 190, 220 directly connected to the end effector 150 are free from any additional connections between the end effector 150 and the first drive arm 120.

Figure 4:
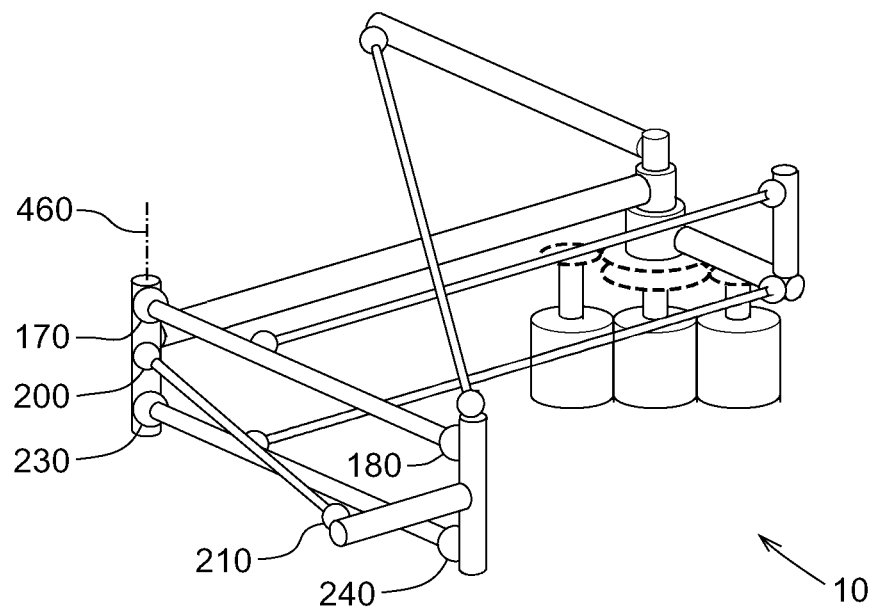
FIG. 4 shows an embodiment of the invention with two stiff rods being part of two separate kinematic chains.

Referring to FIG. 4, according to an alternative embodiment of the robot 10 the first, fifth and seventh joints 170, 200, 230 are arranged on a fifth axis 460 which is a common rotational axis for the three joints. This embodiment enables all the three joints having three DOF. This embodiment also enables the second, sixth and eighth joints 180, 210, 240 to have only one DOF.

Figure 5:
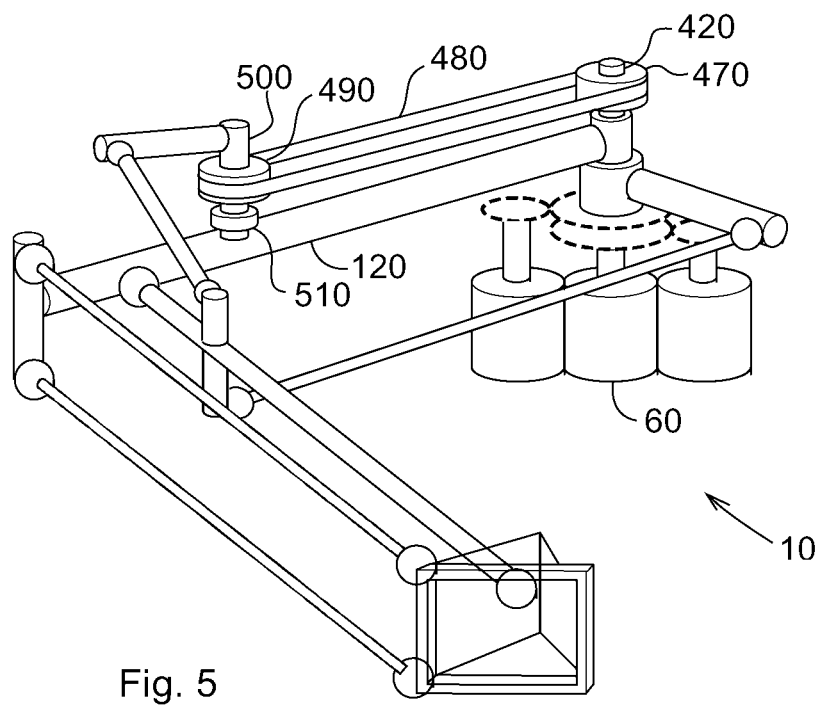
FIG. 5 shows an embodiment of the invention with a kinematic chain comprising a belt mechanism.
Figure 6:
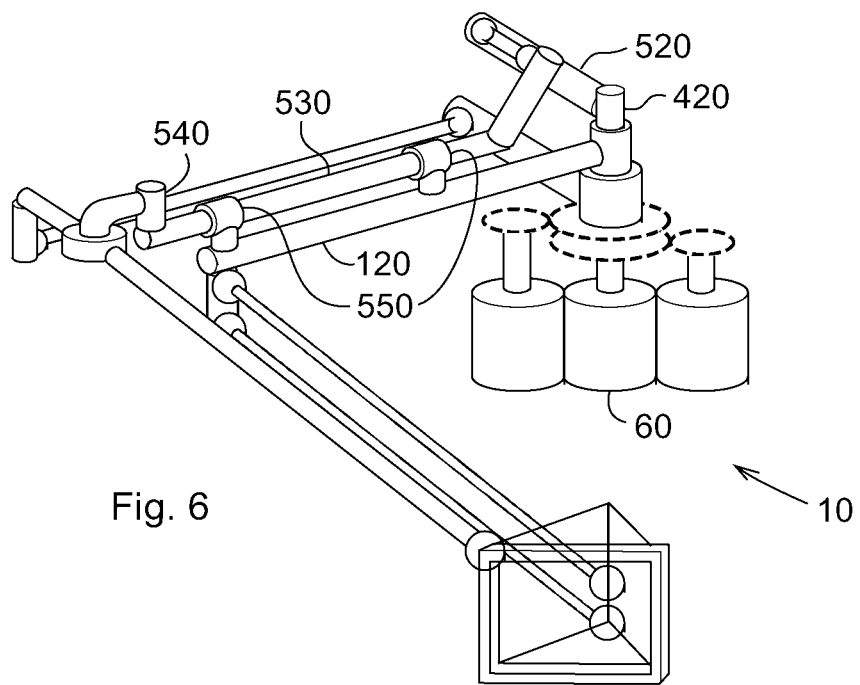
FIG. 6 shows an embodiment of the invention with a kinematic chain comprising a lever mechanism integrated on a drive arm.
Figure 7:
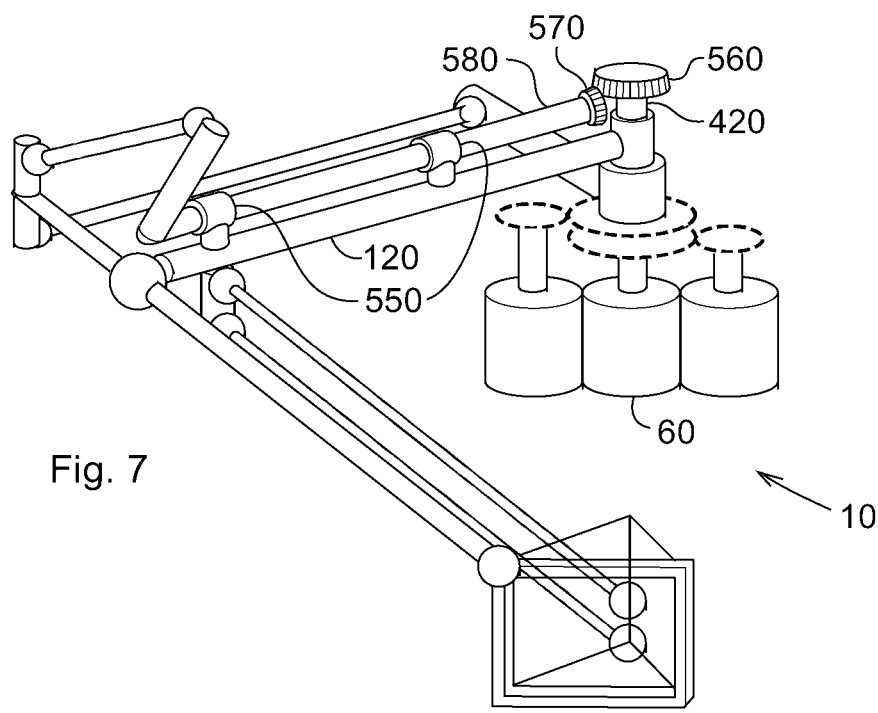
FIG. 7 shows an embodiment of the invention with a kinematic chain comprising a gear mechanism.

Referring to FIGS. 5-7, the respective second kinematic chains are partially integrated with the first drive arm 120. According to FIG. 5 the second kinematic chain comprises a belt mechanism with a primary pulley 470, a belt 480 and a secondary pulley 490. The secondary pulley 490 is fixedly attached to a second drive arm offset beam 500 which in its turn is attached in a rotatable manner in relation to the first drive arm 120 by means of a first bearing 510. According to FIG. 6 the second kinematic chain comprises a lever mechanism with a primary lever 520, a lever shaft 530 and a secondary lever 540. The lever shaft 530 is attached in a rotatable manner in relation to the first drive arm 120 by means of second bearings 550. According to FIG. 7 the second kinematic chain comprises a gear mechanism with a primary gear 560, a secondary gear 570 and a gear shaft 580. The gear shaft 580 is attached in a rotatable manner in relation to the first drive arm 120 by means of the second bearings 550. The primary pulley 470, the primary lever 520 and the primary gear 560, respectively, are fixedly attached to the second output shaft 420 driven by the second servo motor 60.

Figure 8:
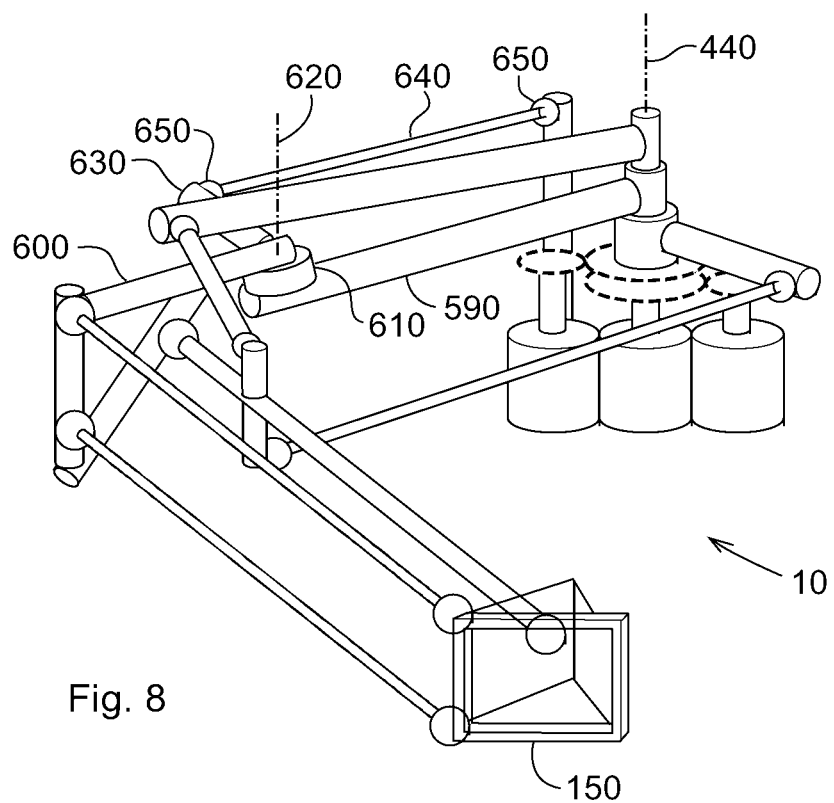
FIG. 8 shows an embodiment of the invention with a drive arm divided into two sections.

Referring to FIG. 8, the orientation of the end effector 150 in relation to the robot frame (not shown) can be kept constant by dividing the first drive arm 120 into two sections; a first drive arm section 590 and a second drive arm section 600. The second drive arm section 600 is attached in a rotatable manner in relation to the first drive arm section 590 by means of a third bearing 610 rotatable about a sixth axis 620 which is parallel with the fourth axis 440. The second drive arm section 600 comprises a third drive arm offset beam 630 which is connected to a fixed point at the robot frame via a link 640 with a node 650 at each end of it. Each of the nodes 650 has at least one rotational DOF, and together with the fourth and the sixth axes 440, 620 the rotational axes of the nodes 650 form corner points of a parallelogram.

The invention is not limited to the embodiments shown above, but the person skilled in the art may modify them in a plurality of ways within the scope of the invention as defined by the claims.

The invention claimed is:
1. An industrial robot, comprising:
   a first actuator configured to rotate a first drive arm about a first axis;

a second actuator configured to rotate a second drive arm about a second axis;

a first kinematic chain configured to transmit rotation of the first drive arm to a respective movement of an end effector, the first kinematic chain comprising (i) a first rod, (ii) a first joint connecting the first drive arm and the first rod, the first joint having at least two degrees of freedom, and (iii) a second joint connecting the first rod and the end effector; and a second kinematic chain configured to transmit rotation of the second actuator to a respective movement of the end effector, the second kinematic chain comprising (i) a second rod, (ii) a third joint connecting the second drive arm and the second rod, (iii) a sub-chain portion connecting the second rod and the first rod, the sub-chain portion including a fourth joint, (iv) the first rod, and (v) the second joint;

wherein movement of the first rod is configured to have at least two degrees of freedom in relation to the first drive arm.

2. The industrial robot according to claim 1, wherein the second kinematic chain is configured to expose the first rod to a bending force.

3. The industrial robot according to claim 1, wherein the second kinematic chain is configured to cause a rotation of the first rod about the first joint.

4. The industrial robot according to claim 1, wherein each of the first drive arm and the second drive arm affects a position of the end effector directly and not via the other of the first drive arm and the second drive arm.

5. The industrial robot according to claim 1, wherein the first kinematic chain further comprises (iv) a third rod, (v) a fifth joint connecting the first drive arm and the third rod, and (vi) a sixth joint connecting the third rod and the end effector.

6. The industrial robot according to claim 5, wherein the first rod and the third rod are geometrically parallel relative to one another.

7. The industrial robot according to claim 5, wherein the first rod is stiffer than the third rod.

8. The industrial robot according to claim 5, wherein the first kinematic chain further comprises (vii) a fourth rod, (viii) a seventh joint connecting the first drive arm and the fourth rod, and (ix) an eighth joint connecting the fourth rod and the end effector.

9. The industrial robot according to claim 8, wherein the first rod, the third rod, and the fourth rod are geometrically parallel relative to one another.

10. The industrial robot according to claim 8, wherein the first joint, the fifth joint, and the seventh joint have a rotational degree of freedom about a common axis.

11. The industrial robot according to claim 1, further comprising:

a third actuator configured to rotate a third drive arm about a third axis; and a third kinematic chain configured to transmit rotation of the third drive arm to a respective movement of the end effector.

12. The industrial robot according to claim 11, wherein each of the first drive arm, the second drive arm, and the third drive arm affects a position of the end effector directly and not via another of the first drive arm, the second drive arm, and the third drive arm.

13. The industrial robot according to claim 11, wherein the first axis, the second axis, and the third axis are geometrically parallel relative to one another.

14. The industrial robot according to claim 11, wherein the first axis, the second axis and the third axis are axially aligned with one another.

15. The industrial robot according to claim 1, wherein the first drive arm is configured to rotate a full circle about the first axis.

16. The industrial robot according to claim 1, wherein all the rods directly connected to the end effector are geometrically parallel relative to one another.

17. The industrial robot according to claim 1, wherein the fourth and the second joints are located on opposite sides of the first joint when considering a direction of a longitudinal axis of the first rod.

18. The industrial robot according to claim 11, wherein the third kinematic chain includes (i) a fifth rod, (ii) a ninth joint connecting the third drive arm and the fifth rod, and (iii) a tenth joint connecting the fifth rod and end effector.

19. The industrial robot according to claim 1, wherein the sub-chain portion further includes: (i) an elbow; (ii) a first hinge connecting the elbow and a first drive arm offset beam; (iii) a first serial rod; (iv) a thirteenth joint connecting the elbow and the first serial rod; and (v) a fourteenth joint connecting the first serial rod and a first rod offset beam.

* * * * *